Sept. 19, 1950  E. MARTIN  2,522,955
MEANS FOR HEATING HOLLOW PROPELLER BLADES
Filed Sept. 14, 1944
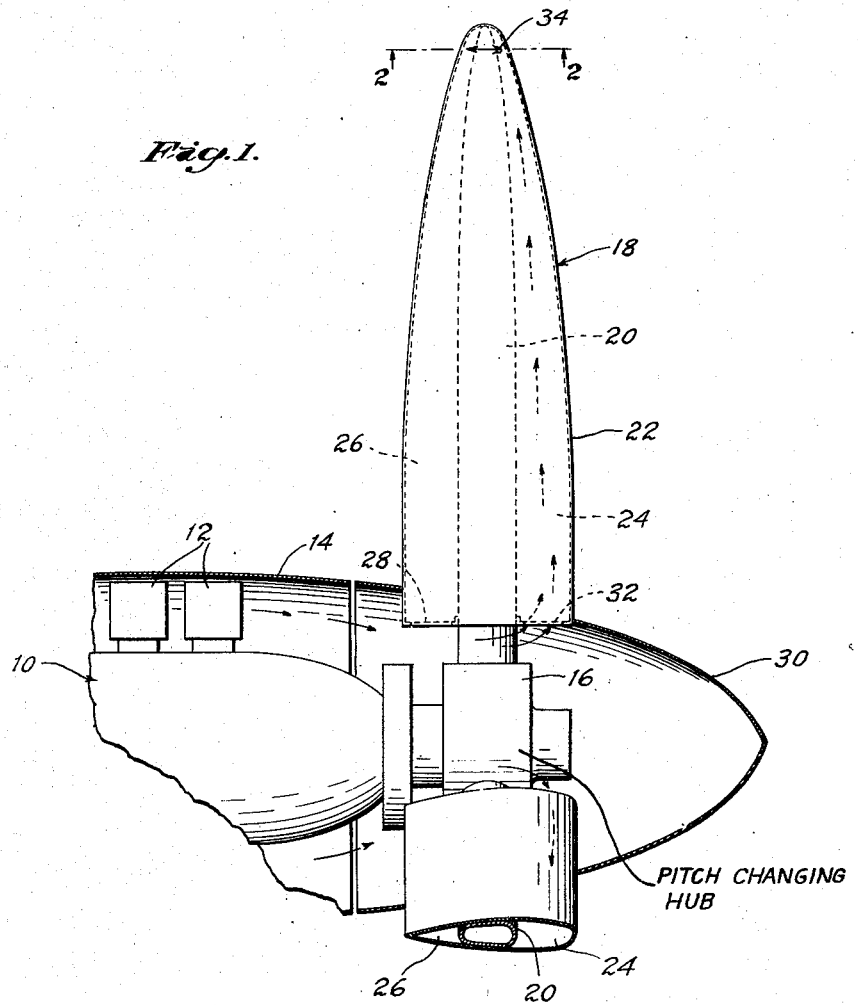
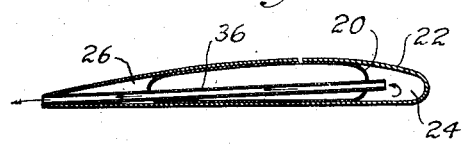
Inventor
Erie Martin
by Harris G. Luther
Attorney Patented Sept. 19, 1950

2,522,955

UNITED STATES PATENT OFFICE 2,522,955

MEANS FOR HEATING HOLLOW PROPELLER BLADES

Erle Martin, West Hartford, Conn., assignor to United Aircraft Corporation, East Hartford, Conn., a corporation of Delaware Application September 14, 1944, Serial No. 554,101

11 Claims. (Cl. 244—134)

This invention relates to propellers and has particular reference to means for pumping air through the propeller blades.

An object of the invention is a propeller which will pump heated air through the blade from adjacent the propeller driving engine.

Another object is a hollow blade having an airfoil forming member terminating within a spinner.

Another object of the invention is a propeller blade comprising a supporting core and an airfoil forming member which define a passage adjacent the leading edge of the blade through which heated air is pumped by rotation of the blade.

Other objects and advantages will be apparent from the specification and claims and from the accompanying drawing which illustrates what is now considered to be a preferred embodiment of the invention.

In the drawing, Fig. 1 is a side elevation, partly in section, of the propeller mounted on an engine.

Fig. 2 is a transverse section on line 2—2 of Fig. 1, and Fig. 3 is a view similar to Fig. 2 showing a modification of the passage outlet.

In the preferred embodiment shown in the accompanying drawing, an engine, generally indicated at 10, has cylinders 12 and is enclosed in a cowling or other housing 14. A propeller hub 16 is mounted on a shaft (not shown) projecting from the engine nose.

The hub 16 may be of any well known design and may be either fixed pitch, such as shown in Patent No. 1,769,775 to Dicks, or it may be of the controllable or adjustable type, such as shown in Patent No. 2,280,714 to Martin. Propeller blades, generally indicated at 18, are supported by the hub 16.

Each blade 18 comprises a strength member or core 20 which may be a hollow tube and which has one end secured in the hub 16, in fixed position in a fixed pitch hub or upon bearings in an adjustable or controllable pitch hub. A covering member 22, usually of sheet metal, is supported by and encircles core member 20 and forms the airfoil contour of the propeller blade. Covering member 22 may be secured to core member 20 in any convenient manner, such as by brazing or silver soldering, and contacts core member 20 throughout a substantial area on the camber and face sides of the blade, but is spaced from core member 20 at the leading and trailing edges. This construction forms a passage 24 at the leading edge of each blade and another passage 26 at the trailing edge of each blade between the core member and the covering member. A bulkhead 28 surrounds the core member at the shank of the blade adjacent hub 16 and closes the end of the covering member. This bulkhead may be secured in position by being brazed or silver soldered to either the core or the covering member, or both.

A spinner 30, which may be supported from blade cores 20 or from hub 16 or both, encloses hub 16 and the inner end of covering member 22 and in the embodiment shown, forms a streamlined continuation of engine housing 14. Bulkhead 28 is provided with an aperture 32 leading into passage 24. As covering member 22 terminates within spinner 30, aperture 32 connects passage 24 with the interior of spinner 30 which, in turn, is connected with the interior of engine housing 14 and the space around the engine.

An orifice 34 is provided in the camber side of the blade adjacent the blade tip and forms a connection in the tip portion of the blade between passage 24 and the outside atmosphere.

Centrifugal force produced by rotation of the propeller blade, acting on the air in passage 24, forces air out of orifice 34 and air is sucked in through aperture 32 to replace the air forced out. The propeller blade, therefore, acts as a pump to remove air from within spinner 30 and from around engine 10. This air is heated to a fairly high temperature, in the neighborhood of 130°, by heat radiated from the engine even where the engine is liquid cooled. This heated air passing through passage 24, adjacent the leading edge of the blade, will heat the blade sufficiently to avoid formation of dangerous accumulations of ice thereon. This construction requires no additional passages in the blade, and, at the same time, confines the airflow to the leading edge portion of the blade where ice is more likely to form.

Where adjustable pitch propellers are used, it has been found that it is unnecessary to provide airtight joints between the blade and the spinner and satisfactory results may be obtained by simply allowing only sufficient clearance in the spinner for movement of the blade.

The discharge adjacent the blade tip may, if desired, be located adjacent the trailing edge of the blades by inserting a conduit 36 through an opening in the trailing edge of the blade and through core member 20 into passage 24 thus connecting passage 24 with the blade trailing edge.

It is to be understood that the invention is not limited to the specific embodiment herein illustrated and described, but may be used in other ways without departure from its spirit as defined by the following claims.

I claim:

1. In combination, a propeller blade having a passage extending longitudinally thereof from the shank portion to the tip portion of the blade adjacent the leading edge, and having an orifice adjacent the blade tip connected with said passage, a hub supporting said blade, a spinner enclosing said hub, said passage opening within said spinner outside of, and at the forward side of, said hub, a source of heat adjacent said spinner, and a passage connecting said source of heat with the interior of said spinner.

2. In combination, a propeller blade having a support member extending longitudinally of the blade and enclosed within a sheet metal covering, said covering being spaced from said support at the leading edge of the blade to provide a passage longitudinally of the blade between the support and the covering and extending from adjacent the shank portion of the blade to the tip portion, and having an orifice adjacent the tip of the blade connecting said passage with the outside of the blade, a hub, means connecting said support member with said hub, a shell enclosing said hub, said covering member terminating between said hub and said shell, an opening in the covering connecting said passage with the shell interior, and means connecting the shell interior with a source of heat.

3. In combination, a propeller blade comprising, a sheet metal tube having an open and a closed end and forming the blade covering carried by a supporting core member and forming the airfoil contour of the blade and spaced from said core member at the leading edge of the blade to form a longitudinally extending passage between the core member and the covering member extending from the shank to the tip of the blade, and having an orifice in the blade tip connected with said passage, a hub, means connecting said support member with said hub, a shell enclosing said hub, the open end of said tube terminating between said hub and said shell, and means connecting the shell interior with a source of heat.

4. In combination, a propeller blade comprising, a sheet metal covering carried by a supporting core member and forming the airfoil contour of the blade and spaced from said core member at the leading edge of the blade to form a longitudinally extending passage between the core member and the covering member extending from the shank to the tip of the blade, an orifice in the blade tip connected with said passage, an engine, a hub positioned adjacent said engine and supporting said core member, a continuously streamlined housing for said hub and said engine including a propeller spinner and engine cowling in juxtaposed relation, said sheet metal covering terminating between said hub and said spinner, an opening in said covering connecting said passage directly with the interior of said housing whereby air is pumped from within said streamlined enclosure through said passage and out of said orifice.

5. In combination, a propeller blade comprising, a sheet metal covering carried by a supporting core member and forming the airfoil contour of the blade and spaced from said core member at the leading edge of the blade to form a longitudinally extending passage between the core member and the covering member extending from the shank to the tip of the blade, an orifice in the blade tip connected with said passage, an engine, a hub positioned adjacent said engine and supporting said blades, a substantially continuously streamlined housing comprising, a propeller spinner and an engine cowling enclosing said hub and engine, said covering terminating between said hub and said spinner and said passage opening directly into said spinner whereby air heated by said engine is pumped from within said streamlined enclosure through said passage and out of said orifice.

6. In combination, a propeller blade having a passage extending longitudinally thereof adjacent the leading edge and extending from the shank portion of the blade to the tip portion of the blade, and having an orifice in the camber face of the blade in the tip portion of the blade and connected with said passage, a hub supporting said blade, a spinner enclosing said hub, said passage opening within said spinner at the forward side of, and outside of, said hub, a source of heat adjacent said spinner, and a passage connecting said source of heat with the interior of said spinner.

7. In combination, a propeller blade having a passage extending longitudinally thereof adjacent the leading edge and extending from the shank portion of the blade to the tip portion of the blade, and having an orifice in the trailing edge of the blade in the blade tip portion and a conduit connecting said orifice with said passage, a hub supporting said blade, a spinner enclosing said hub, said passage opening within said spinner at the forward side of, and outside of, said hub, a source of heat adjacent said spinner, and a passage connecting said source of heat with the interior of said spinner.

8. In combination, a propeller blade comprising, a sheet metal tube having an open and a closed end and forming the blade covering carried by a supporting core member and forming the airfoil contour of the blade and spaced from said core member at the leading edge of the blade to form a longitudinally extending passage between the core member and the covering member extending from the shank to the tip of the blade, and having an orifice in the camber face of the blade in the tip portion of the blade connected with said passage, a hub, means connecting said support member with said hub, a shell enclosing said hub, the open end of said tube terminating between said hub and said shell, and means connecting the shell interior with a source of heat.

9. In combination, a propeller blade comprising, a sheet metal tube having an open and a closed end and forming the blade covering carried by a supporting core member and forming the airfoil contour of the blade and spaced from said core member at the leading edge of the blade to form a longitudinally extending passage between the core member and the covering member extending from the shank to the tip of the blade, and having a conduit located in the tip portion of the blade passing through the blade core and connecting said passage with an opening at the trailing edge of the blade, a hub, means connecting said support member with said hub, a shell enclosing said hub, the open end of said tube terminating between said hub and said shell, and means connecting the shell interior with a source of heat.

10. In combination, a propeller blade comprising, a sheet metal covering carried by a supporting core member and forming the airfoil contour of the blade and spaced from said core member at the leading edge of the blade to form a longitudinally extending passage between the core member and the covering member extending from the shank to the tip of the blade, an orifice in the camber face of the blade in the tip portion of the blade, an engine, a hub positioned adjacent said engine and supporting said blades, a streamlined housing comprising, a propeller spinner and an engine cowling enclosing said hub and engine, said passage opening into said spinner whereby air heated by said engine is pumped from within said streamlined enclosure through said passage and out of said orifice.

11. In combination, an engine, a propeller hub mounted adjacent to and driven by said engine, means enclosing said engine, a spinner enclosing said hub and forming a streamlined continuation of said engine enclosing means, a propeller blade core mounted for pitch changing movements in said hub, a covering member supported by said core and forming with said core a passage extending longitudinally of the blade adjacent the leading edge thereof, said covering member terminating within said spinner and said passage opening directly into said spinner, and an orifice in the tip portion of the blade connected with said passage.

ERLE MARTIN.

REFERENCES CITED

The following references are of record in the file of this patent:

UNITED STATES PATENTS

| Number | Name | Date |
|---|---|---|
| 1,879,717 | Sikorsky | Sept. 27, 1932 |
| 1,950,411 | Larsen | Mar. 13, 1934 |
| 2,041,796 | Stalker | May 26, 1936 |
| 2,272,358 | Steinhaus | Feb. 10, 1942 |
| 2,318,233 | Keller | May 4, 1943 |
| 2,446,663 | Palmatier | Aug. 10, 1948 |

FOREIGN PATENTS

| Number | Country | Date |
|---|---|---|
| 231,919 | Great Britain | Apr. 7, 1925 |
| 412,487 | Great Britain | June 28, 1934 |
| 504,737 | Great Britain | Jan. 17, 1938 |
| 506,444 | Great Britain | May 30, 1939 |
| 807,110 | France | Oct. 12, 1936 |
| 837,466 | France | Nov. 12, 1938 |